Jan. 23, 1940.                M. HERZIG                2,187,971
            AUTOMATIC VALVE FOR FLUIDS UNDER INTERMITTENT PRESSURE
                         Filed Nov. 20, 1936
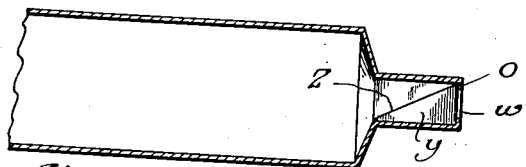
Fig. 1-a.
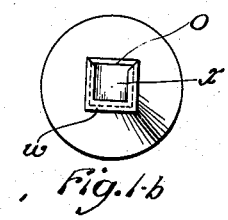
Fig. 1-b.
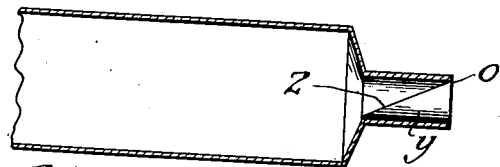
Fig. 2-a.
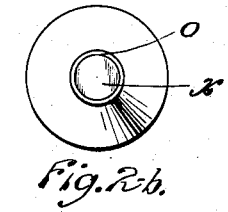
Fig. 2-b.
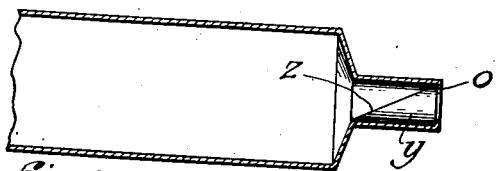
Fig. 3-a.
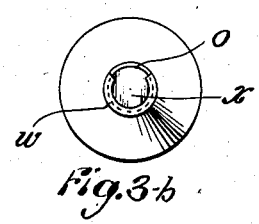
Fig. 3-b.
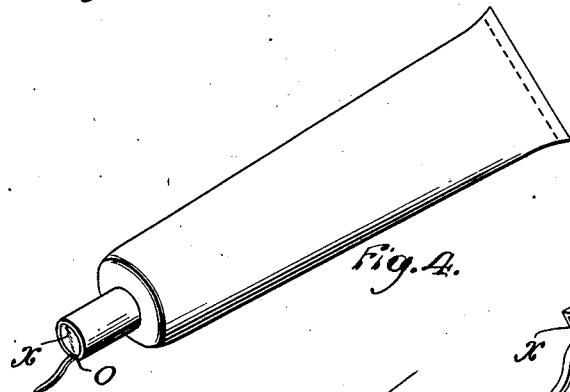
Fig. 4.
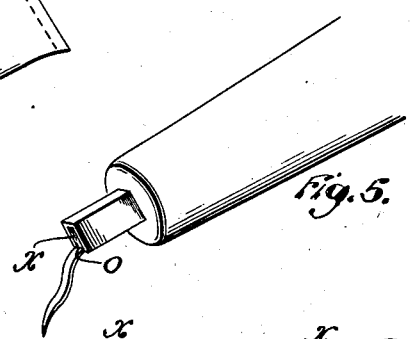
Fig. 5.
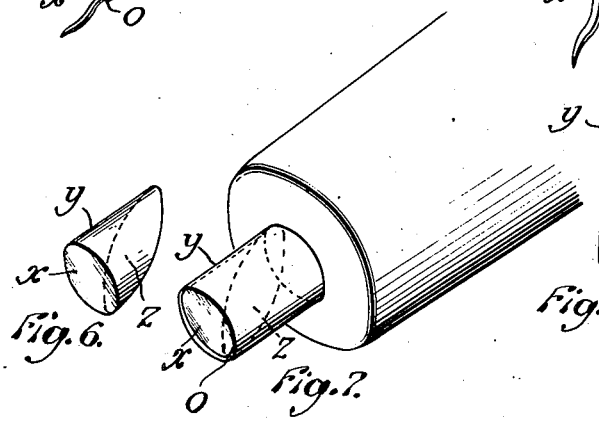
Fig. 6.    Fig. 7.
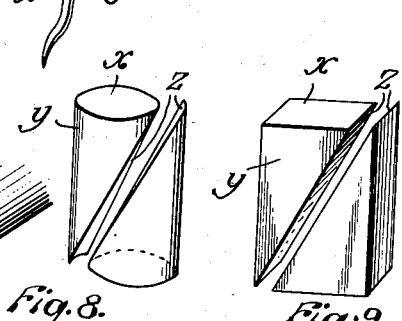
Fig. 8.    Fig. 9.
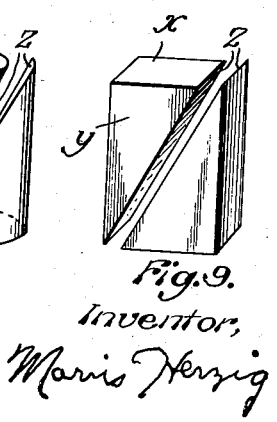
Inventor,
Maris Herzig Patented Jan. 23, 1940

2,187,971

UNITED STATES PATENT OFFICE 2,187,971

AUTOMATIC VALVE FOR FLUIDS UNDER INTERMITTENT PRESSURE

Morris Herzig, Oakland, Calif., assignor to Max Leopold Herzig, Seattle, Wash.

Application November 20, 1936, Serial No. 111,881

5 Claims. (Cl. 221—60)

My invention relates to an improvement in automatic valve closure for viscous substances when subjected to intermittent pressure as described and claimed below. The application of the valve principle is best exemplified in an automatic cap for collapsible tubes containing a viscous material.

The object of the invention is to provide a new and useful automatic closure for collapsible tubes which is of simple construction, which is practical in principle, and which allows for an automatic formation of an opening for fluid containers of a collapsible type, which allows for emanation of the tubal contents upon application of pressure to the viscous contents and the automatic sealing of the opening upon release of pressure.

I attain these objects by forming a valve composed finally of two parts: a resilient material placed in a position such that the component of force in the viscous body perpendicular to internal surface of the resilient material forces the resilient material to compress in a direction more or less perpendicular to the longitudinal axis of the tube or the direction of flow of the contents.

In the application of pressure to the tube the component of pressure perpendicular to the internal surface of the resilient material forces the resilient material to compress in a lateral direction allowing the contents of the tube to escape thru the opening resulting from the compression of the resilient material. Upon release of pressure the resilient material re-assumes its original shape and seals the opening, stopping the flow of the viscous contents.

In the accompanying drawing Figures 1a, 2a, and 3a are sagittal sections through the tube and the resilient material; Figures 1b, 2b, and 3b are end-on views of the tube and cap; Figures 4 and 5 are perspective views of the completed tube and cap, Figure 4 showing, among many possible shapes, a plain, flat, round-ended cap while Figure 5 is a plain, flat-shaped cap but with a square end; Figure 6 shows the essential resilient material removed from its matrix in the tube or neck; Figure 7 is a perspective view showing the position of the resilient material of Figure 6 in place in the neck of the tube; Figures 8 and 9 attempt more adequately to convey the exact shape of the resilient material in a round form, as in Figure 4, and the square form, as in Figure 5, respectively, as well as showing a method of cutting and forming the resilient material. This is attempted by projecting the resilient material in the form of a cylinder and a rectangular prism, respectively, and showing the desired product as the forms resulting when the cylinder and the rectangular prism are cut by an oblique plane.

For reference to parts of the drawing the letters $o$, $w$, $x$, $y$, and $z$ are used. $w$ is the tab or shoulder of one piece with the neck of the tube to be used to secure the resilient material when desired. $x$, $y$, and $z$ are sides of the cut material, and $o$ is the opening formed when the resilient material is compressed by the pressure of the contents during the use of the tube. All letters refer to the same parts in each part of the drawing.

After cutting out a tube and cap all in one piece, the resilient material is placed in the neck of the tube. Sides of the resilient material labelled $y$ in Figures 1a, 2a, 6, 7, 8, and 9 are placed in contact with the internal walls of the neck portion of the tube as indicated in Figure 7, where the wedge-shaped piece of resilient material, which is shown separately in Figures 6, 7, 8, and 9, is drawn in its proper position in the neck of the tube. The resilient material may be held in position by gluing or by tabs externally, as shown in Figures 1a, 1b, 3a, and 3b where the tabs are labelled $w$; and, by the pressure of the contents of the tube, it may be held in position internally. The lateral component of pressure exerted on the wall, $z$, of the resilient material tends to hold the material in place even in the absence of other means of attachment though some kind of additional attachment is desirable even where a good frictional contact is possible.

When pressure is applied to the tube the contents exert a lateral pressure to the surface of the resilient material marked as the surface $z$. The result is that the resilient material is compressed and distorted laterally causing an opening to occur at $o$. And it is through this opening that the viscous contents of the tube escape. Upon release of pressure the resilient material, by its very resilient nature, re-establishes its original, undistorted shape and thereby seals the tube by closing the opening at $o$.

The above description, while made of a closure on a collapsible tube, is intended to convey the more general impression that the invention claimed is of a valve having general application where fluids are subjected to intermittent pressure. The opening at $o$ may be cut at the side of the cap instead of on the end, and it may take any one of a countless number of shapes such as oval, round, squared, star-shaped and rectangular. Where the opening, $o$, is at the side of the neck the end of the tube is sealed, the resilient material is elongated at its most massive transverse end, the dimensions of the end (where the resilient material completely fills the neck of the tube, as it does in the most distal end in Figure 7, for example) are carried along until there is a sufficient area of uniform thickness to enable the complete covering of the new opening when there is no pressure placed on the contents. The opening, o, may thus appear on any portion of the surface of the neck according to the desire of the maker and in any case where the end of the tube, indicated by x in Figures 1b, 2b, and 3b, is completely formed with the rest of the tube and neck of the tube no attachment of the resilient material is necessary other than simple insertion. The best formation of the valve of which I have knowledge is of a rubber resilient material, but anything of a resilient character in keeping with the spirit of this specification with the exceptions specifically referred to below.

The newness and usefulness of my invention lies in its ideal simplicity of form and design which is the reason for my desire to indicate, for the purpose of couching my claims in more exact, clear and unambiguous language, that ideally my valve is formed in the entire absence of air, vacant, extraneous, unused or vacuumatic spaces; that it has no spaces of any kind where the viscous fluid contents of the tube may collect or ooze into between parts to hinder or stop the proper functioning of the valve; that the resilient body in my valve may be hollow or have a space either within itself or, as in a case where there is a permanently sealed and useful compartment inside the resilient material as found in an ordinary tennis ball and which serves to enhance its relative resiliency; that there are no blanks to be cut or bent, that there are no flanges either attached to the resilient body or forming a part thereof; that there are no slides, pivots or sliding, pivoted, or pivoting parts, no reeds, no plates nor springs nor spring plates nor covers necessary for its proper functioning; that projections need not exist within the tube or neck unless specifically and expressly desired; that there are no parts that slide or need great, expensive, and unnecessary precision for production or assembly of the valve; that the valve can be made in three simple machine operations: (1) stamping out the tube and neck in one piece, (2) stamping out or cutting out the resilient material, and (3) inserting the resilient piece into the neck of the tube where it may be held in place by frictional contact, shoulders, or glued in any manner, as by dipping.

I claim:

1. In combination with a collapsible tube having a discharge passage and a discharge opening at a side of said passage, a body of resilient compressible material mounted in said passage at the outer end thereof and covering said opening to close said passage, and means extending across the outer end of said passage and confining said body in said passage and for longitudinal compression therein.

2. In combination with a collapsible tube having a discharge passage communicating with the interior of said tube and provided with a discharge opening at a side of said passage, a body of resilient compressible material mounted in said passage and normally covering said opening and provided with a side inclined to the axis of said passage and extending from adjacent said opening at the inner side thereof in said passage to a transversely and longitudinally spaced position, and means extending across said passage at the end thereof for confining said member to a longitudinal compression therein.

3. In combination with a collapsible tube having a cylindrical discharge passage and a discharge opening at a side of said passage, a cylindrical body of resilient compressible material mounted in said passage at the end thereof and covering said opening, said body being formed with a diagonal elliptical side extending from adjacent said opening at the inner side of said opening in said passage to a transversely and longitudinally spaced position, and means extending across the outer ends of said passage and confining said body therein.

4. In combination with a collapsible tube having a cylindrical discharge passage and a discharge opening at a side of said passage, a cylindrical body of resilient compressible material mounted in said passage at the end thereof and covering said opening, said body being formed with a diagonal elliptical side extending from adjacent said opening at the inner side of said opening in said passage to a transversely and longitudinally spaced position, and means extending across the outer ends of said passage and confining said body therein, the incline of said side being such as to produce a transverse force component against said side greater than the longitudinal component thereagainst upon pressing of fluid in said tube against said side.

5. In combination with a collapsible tube having a neck portion with a discharge passage therein of substantially uniform size and extending to substantially the outer end of said neck, means extending transversely across said end and covering all but a side portion of said end and said passage, and a body of compressible resilient material mounted in said passage against the side walls thereof and against said means to normally close said passage and having an inclined side extending diagonally across said passage from said end side portion to an opposite side of said passage.

MORRIS HERZIG.